United States Patent
Archambault et al.

(10) Patent No.: US 8,931,848 B2
(45) Date of Patent: Jan. 13, 2015

(54) ROTATING FOOTREST ASSEMBLY FOR A SEAT

(71) Applicant: Baultar I.D. Inc., Quebec (CA)

(72) Inventors: Etienne Archambault, Quebec (CA); Augustin Archambault, Quebec (CA)

(73) Assignee: Baultar I.D. Inc., Val Joli (Quebec) (CA)

(*) Notice: Subject to any disclaimer, the term of this patent is extended or adjusted under 35 U.S.C. 154(b) by 216 days.

(21) Appl. No.: 13/624,479

(22) Filed: Sep. 21, 2012

(65) Prior Publication Data

US 2014/0084659 A1 Mar. 27, 2014

(51) Int. Cl.
- A47C 1/034 (2006.01)
- A47C 7/50 (2006.01)
- B60N 2/44 (2006.01)
- B60N 2/02 (2006.01)
- B60N 3/06 (2006.01)
- B60N 2/24 (2006.01)

(52) U.S. Cl.
CPC .. *B60N 2/44* (2013.01); *B60N 2/02* (2013.01); *B60N 3/063* (2013.01); *B60N 2/24* (2013.01); *B60N 2/4495* (2013.01)
USPC ................................ 297/423.26; 297/423.25

(58) Field of Classification Search
USPC ............ 297/423.19, 423.25, 423.26, 423.38, 297/423.27–423.3
See application file for complete search history.

(56) References Cited

U.S. PATENT DOCUMENTS

| | | | |
|---|---|---|---|
| 3,642,320 A | 2/1972 | Ward | |
| 4,148,524 A | 4/1979 | Guyton | |
| 4,408,801 A * | 10/1983 | Edel et al. | 297/423.38 |
| 4,426,115 A | 1/1984 | Bissonnette | |
| 5,011,227 A * | 4/1991 | van Hekken et al. | 297/423.26 |
| 5,374,102 A | 12/1994 | Archambault et al. | |
| 5,988,754 A | 11/1999 | Lamart et al. | |
| 6,012,775 A | 1/2000 | Czarnecki | |
| 7,530,639 B2 | 5/2009 | Groelsma et al. | |
| 2011/0168077 A1 | 7/2011 | Bostrom et al. | |

* cited by examiner

*Primary Examiner* — Sarah B McPartlin
(74) *Attorney, Agent, or Firm* — Nath, Goldberg & Meyer; Joshua B. Goldberg; Tanya E. Harkins (57) ABSTRACT

A modular footrest assembly allowing an independent height and swivel adjustment functionality for a pedestal or wall-mounted seat configured in a modular manner. The footrest swivel is independent of the seat swivel and is obtained by manually lifting the seat until the swivel latch is disengaged. The footrest is then rotated and manually laid down to position on a bottom height limit. The footrest height adjustment is independent of the footrest swivel and is optional. The footrest may include a lockable piston element activated by a foot button to modify the bottom height limit position. The footrest swivel position may be manually changed in any height position and the height adjustment is the same after the swivel position modification. A damper may be added to the system to prevent a free drop of the foot support during a manual swivel adjustment operation.

17 Claims, 9 Drawing Sheets

ROTATING FOOTREST ASSEMBLY FOR A SEAT

FIELD OF THE INVENTION

The present invention relates to a vehicle seat footrest system. More particularly, the present invention relates to a modular footrest assembly with an independent height and swivel adjustment mechanism.

BACKGROUND OF THE INVENTION

U.S. Pat. No. 5,374,102 describes a seat footrest height adjustment mechanism which uses two arms pivotally mounted on the seat base, one foot platform and a power lockable cylinder pivotally mounted on the seat base and the foot platform which is unlock with a button located on the foot platform. This design does not allow swivel of the footrest and is not storable.

There are other footrest systems that include a swivel system independent of the seat position, such that the footrest is storable on a rear side of the seat. This well-known system allows footrest free swivel when the footrest is raised at its upper position using a height footrest adjustment mechanism. In this position, a latch swivel locking system is unlatched such that the footrest can rotate. This system has the down side of having a footrest height adjustment mechanism and the swivel mechanism interdependently linked.

The invention described in the US patent application 2011168077A1 mentions a footrest system with a height adjustment mechanism and a flip mechanism for storage under the seat. The swivel of the footrest is not independent of the seat swivel. The Footrest is therefore allowed in front of the seat, either in a position for use or in storage under the seat pan forward side. This storage configuration is acceptable from a clearance standpoint when circulating around the seat, but it could be disturbing for an occupant seated on the seat, but not using the footrest.

Other patent documents describing footrest assemblies include U.S. Pat. No. 3,642,320, U.S. Pat. No. 4,148,524, U.S. Pat. No. 4,426,115, U.S. Pat. No. 5,988,754, U.S. Pat. No. 6,012,775, and U.S. Pat. No. 7,530,639.

There is thus a need for a footrest assembly, which by virtue of its design and components would be able to overcome or at least minimize at least one of the above-mentioned drawbacks.

SUMMARY OF THE INVENTION

The object of the present invention is to provide a footrest assembly that addresses at least one of the above-mentioned needs.

According to the present invention, there is provided a modular footrest assembly for mounting onto a seat base, the footrest assembly comprising:
- a foot support element;
- a cylindrical base element mountable onto the seat base;
- a swivel element comprising an external cylinder rotatable about the cylindrical base element and a fixed pivot structure extending towards the foot support element;
- a retaining ring mounted on the cylindrical base element to rotationally guide the swivel element and comprising a plurality of rotation notches;
- an arm assembly having a first end pivotably attached to the fixed pivot structure and a second end attached to the foot support element;
- a swivel latch mechanism for locking a position of the swivel element, the swivel latch mechanism comprising:
  - a latch element pivotably mounted on the fixed pivot structure and comprising an arm interface assembly and a plunger shaped to engage each of the plurality of rotation notches on the retaining ring; and
  - a resilient element for urging the plunger towards engagement with one of the plurality of rotation notches, wherein the swivel element is rotationally repositionable by lifting the arm assembly in a swivel reconfiguration position whereby, in the swivel reconfiguration position, the arm assembly contacts the arm assembly contact surface on the latch element and pivots the plunger away from engagement with said one of the plurality of rotation notches.

BRIEF DESCRIPTION OF THE DRAWINGS

These and other objects and advantages of the invention will become apparent upon reading the detailed description and upon referring to the drawings in which.

DETAILED DESCRIPTION OF THE INVENTION

In the following description, the same numerical references refer to similar elements. Furthermore, for the sake of simplicity and clarity, namely so as not to unduly burden the figures with several reference numbers, only certain figures have been provided with reference numbers, and components and features of the present invention illustrated in other figures can be easily inferred therefrom. The embodiments, geometrical configurations, and/or dimensions shown in the figures are preferred for exemplification purposes only.

Moreover, although the present invention was primarily designed for a seat mountable in a vehicle, for example, it may also be mountable to other devices or in other fields, as apparent to a person skilled in the art. For this reason, expressions such as "vehicle", "seat", etc., as used herein should not be taken as to limit the scope of the present invention and includes all other kinds of materials, objects and/or purposes with which the present invention could be used and may be useful.

In addition, although the preferred embodiment of the present invention as illustrated in the accompanying drawings comprises various components and although the preferred embodiment of the adjustment system as shown consists of certain geometrical configurations as explained and illustrated herein, not all of these components and geometries are essential to the invention and thus should not be taken in their restrictive sense, i.e. should not be taken as to limit the scope of the present invention. It is to be understood, as also apparent to a person skilled in the art, that other suitable components and cooperations thereinbetween, as well as other suitable geometrical configurations may be used for the adjustment systems, and corresponding parts, according to the present invention, as briefly explained and as can easily be inferred herefrom by a person skilled in the art, without departing from the scope of the invention.

An object of the invention is to provide a footrest assembly allowing independent height and swivel adjustment functionality for a pedestal or wall-mounted seat configured in a modular manner. The footrest swivel is independent of the seat swivel and is obtained by manually lifting the foot support element until the swivel latch mechanism is disengaged. The foot support element is then rotated and manually laid down to position on a bottom height limit. The footrest height adjustment is independent of the footrest swivel. In certain preferred embodiments, an optional lockable piston element activated by a trigger element, for example a foot button, can modify the bottom height limit position. The footrest swivel position can be manually changed in any height position and the height adjustment is the same after the swivel position modification. A damper can be added to the system to prevent a free drop of the foot support element during a manual swivel adjustment operation.

Figure 1:
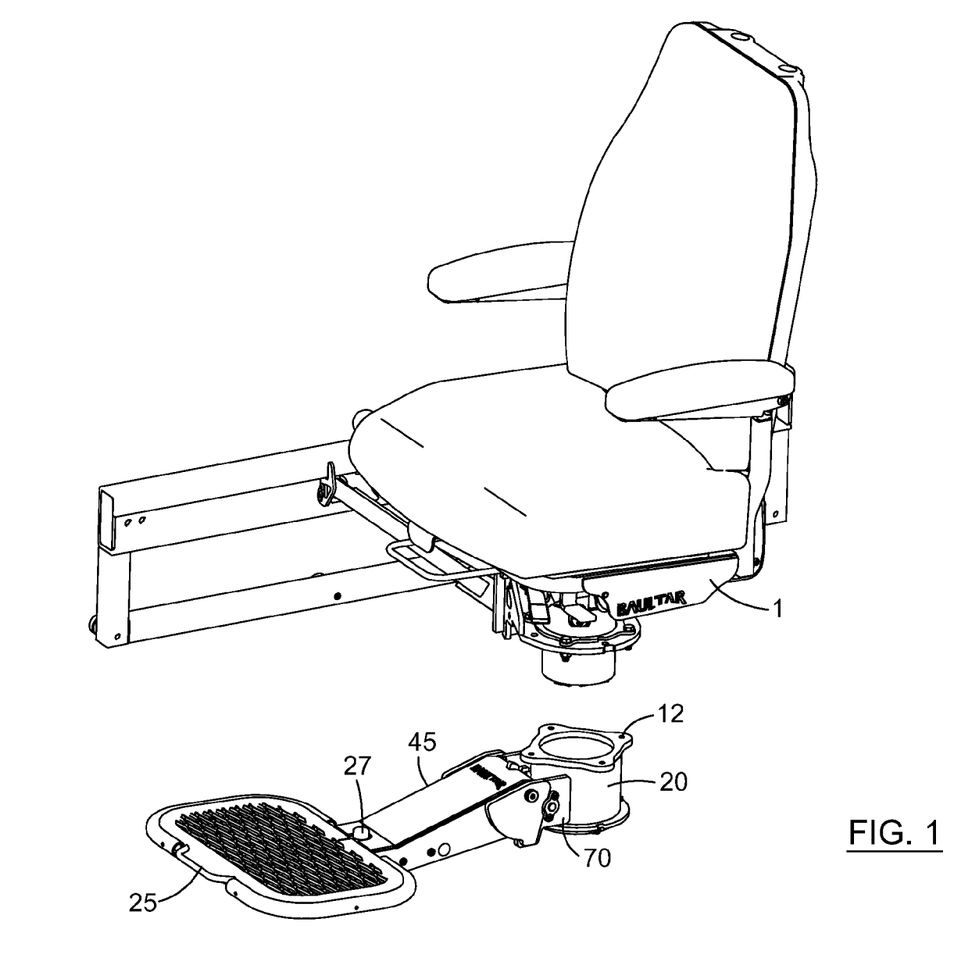
FIG. 1 is a perspective exploded view of a footrest assembly upon mounting onto a wall-mounted seat base according to a preferred embodiment of the present invention.
Figure 3:
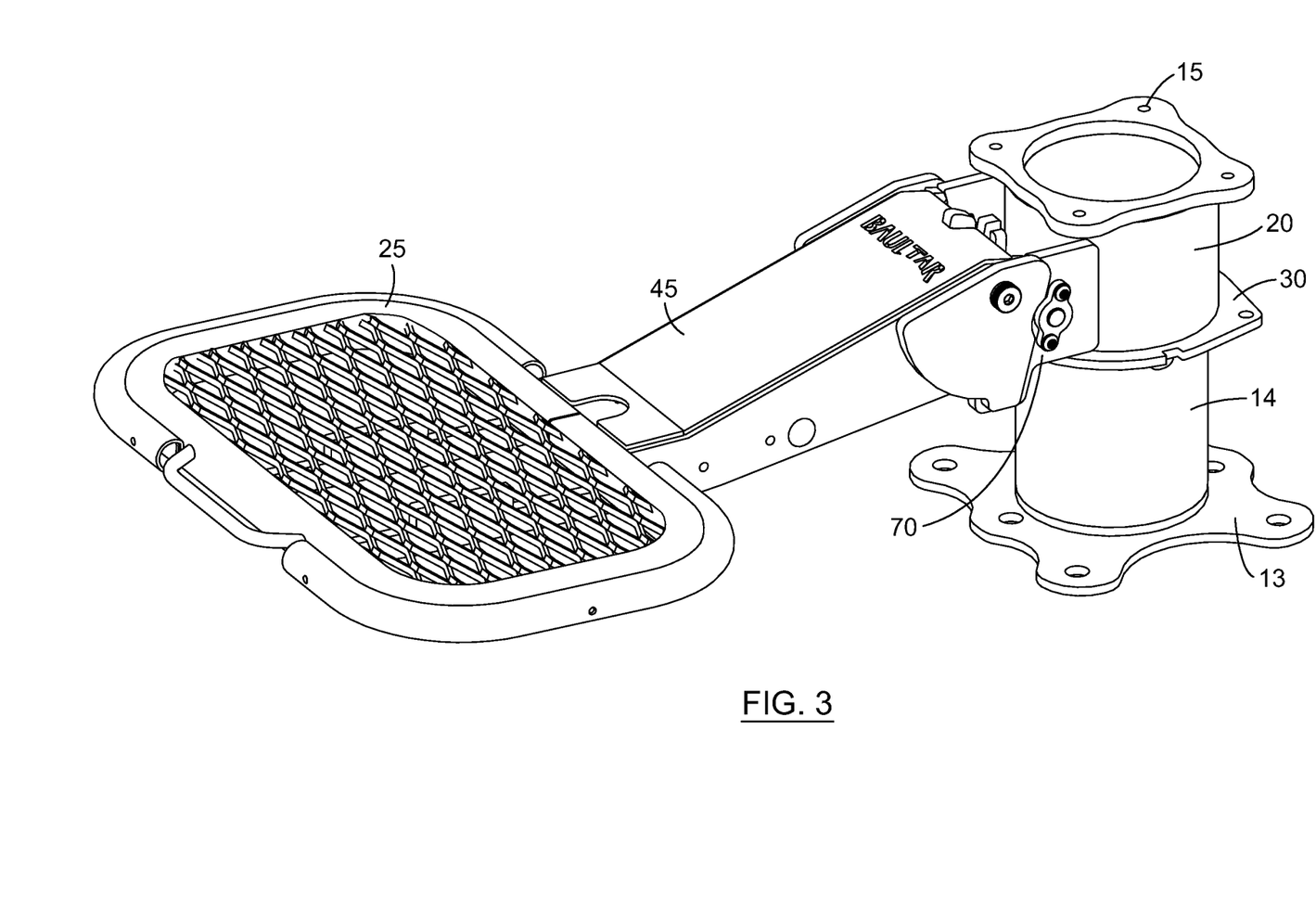
FIG. 3 is a perspective view of a footrest assembly mounted onto a pedestal seat base according to another preferred embodiment of the present invention.
Figure 4:
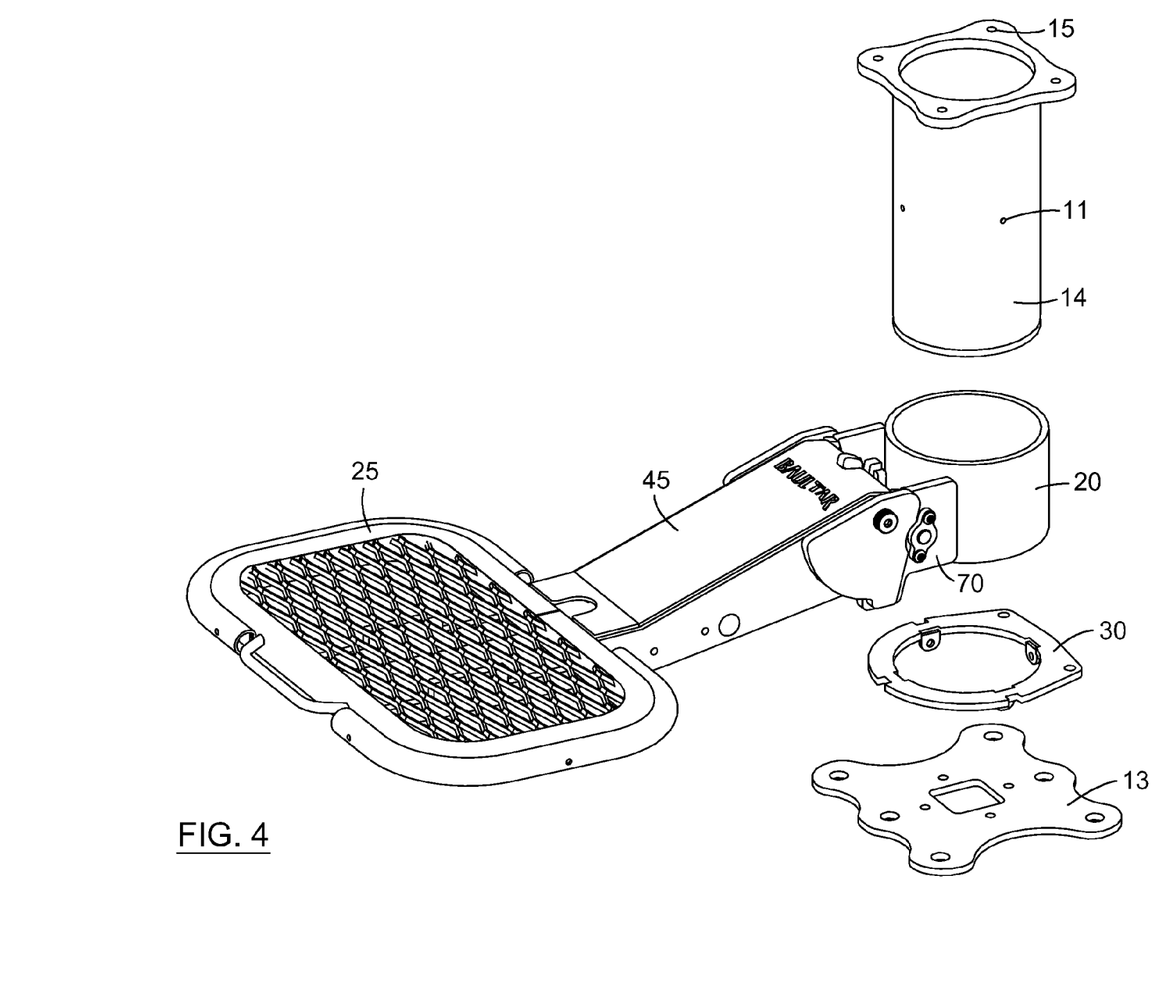
FIG. 4 is a perspective exploded view of the footrest assembly shown in FIG. 3.

More particularly, and in accordance with the present invention, the above object is achieved with a footrest assembly allowing height and swivel adjustments in a modular manner and configured for assembly on a wall-mounted seat base 1 as shown in FIG. 1 or on a pedestal seat base as shown in FIG. 3 or 4.

As shown in FIGS. 1-4, the footrest assembly includes a foot support element 25. A cylindrical base element, for example element 10 on FIG. 2 for a wall-mounted seat base or element 14 on FIGS. 3-4, allows mounting of the footrest assembly onto the seat. The fixed cylindrical base element may be preferably provided with mounting interfaces (element 12 on FIGS. 1-2 or element 15 on FIGS. 3-4).

Figure 2:
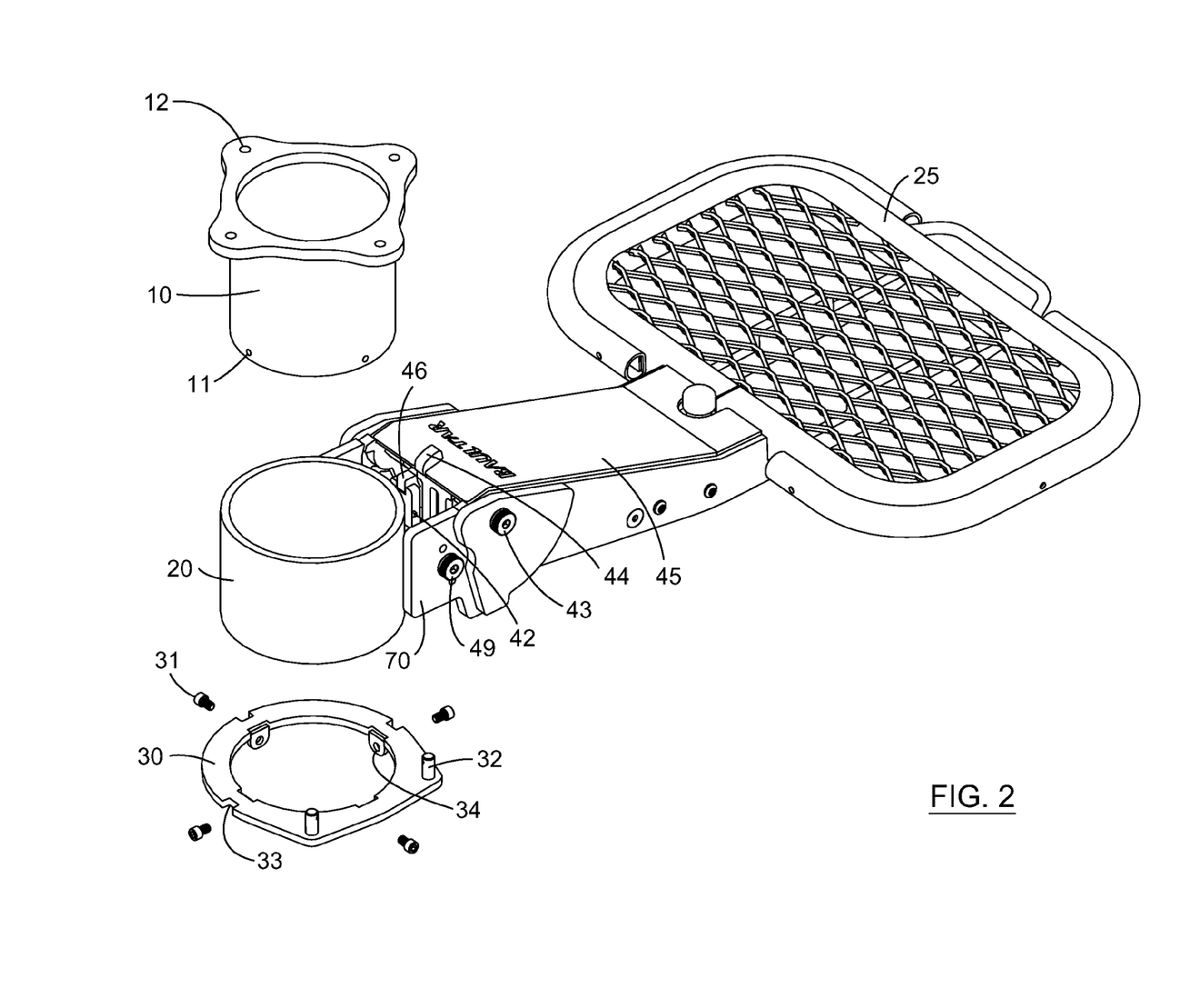
FIG. 2 is a perspective exploded view of the footrest assembly shown in FIG. 1.

The assembly further includes a swivel element 20 having an external cylinder rotatable about the cylindrical base element 10 or 14 and a fixed pivot structure 70 extending towards the foot support element 25. As better shown in FIGS. 2-4, a retaining ring 30 mounted on the cylindrical base element 10 or 14 is provided to rotationally guide the swivel element 20. The retaining ring 30 includes a number of rotation notches 33. As shown in FIG. 2, other embodiments of the retaining ring 30 may include, if necessary, rotation limiters 32 or fixation loops 34.

An arm assembly 45 has opposite ends linking the fixed pivot structure 70 to the foot support element 25. The arm assembly 45 is pivotably attached to the fixed pivot structure 70.

Figure 7:
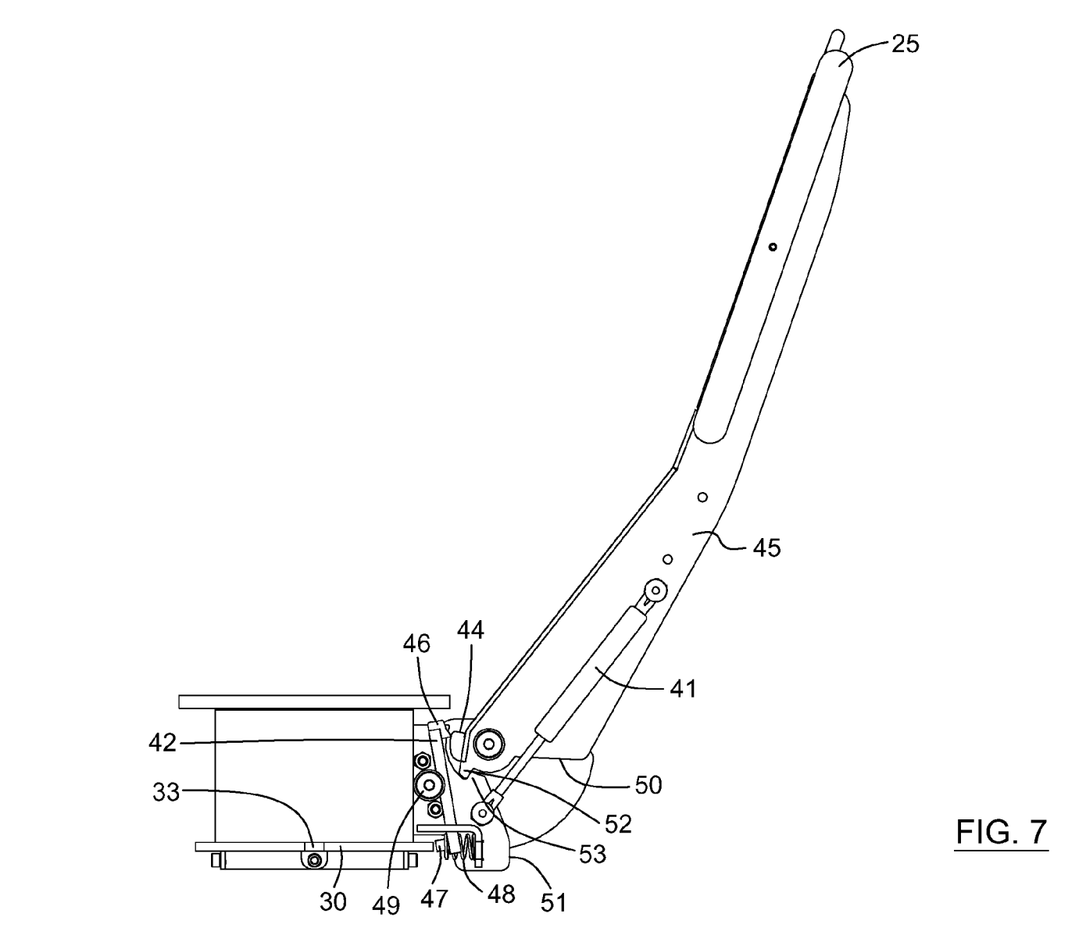
FIG. 7 is a side partially cut view of a footrest assembly according to another preferred embodiment of the present invention.

The footrest assembly is provided with a swivel latch mechanism for locking a position of the swivel element 20. As better shown in FIG. 2, the swivel latch mechanism includes a latch element 42 pivotably mounted on the fixed pivot structure 70 and having an arm interface assembly, preferably including first and second cam elements 44, 46. The latch element 42 is mounted about a pivot 49 and is linked to the first cam element 46. As better shown in FIG. 7, the latch element 42 also includes a plunger 47 shaped to engage each of the plurality of rotation notches 33 on the retaining ring 30. The plunger 47 may be urged towards engagement with the rotation notches 33, by a resilient element, for example a spring 48.

Figure 5:
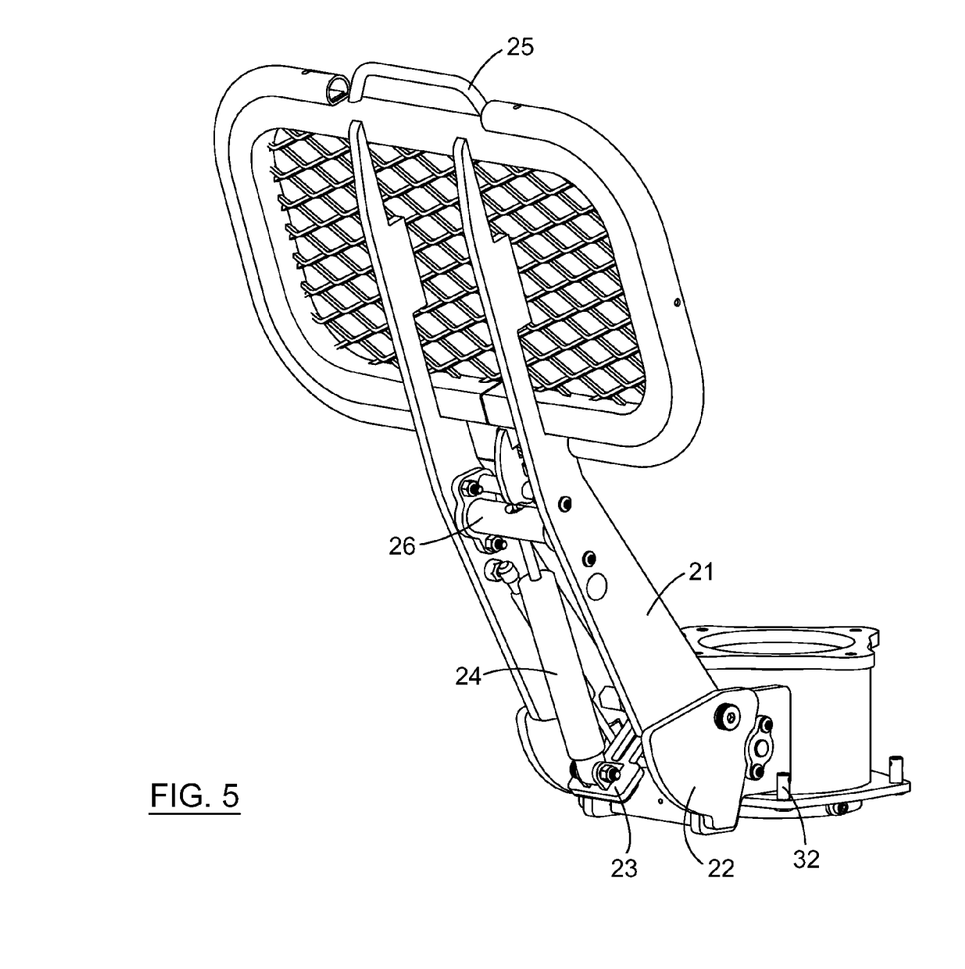
FIG. 5 is a perspective view of the footrest assembly shown in FIG. 2, with the arm assembly in an upper swivel reconfiguration position.
Figure 6:
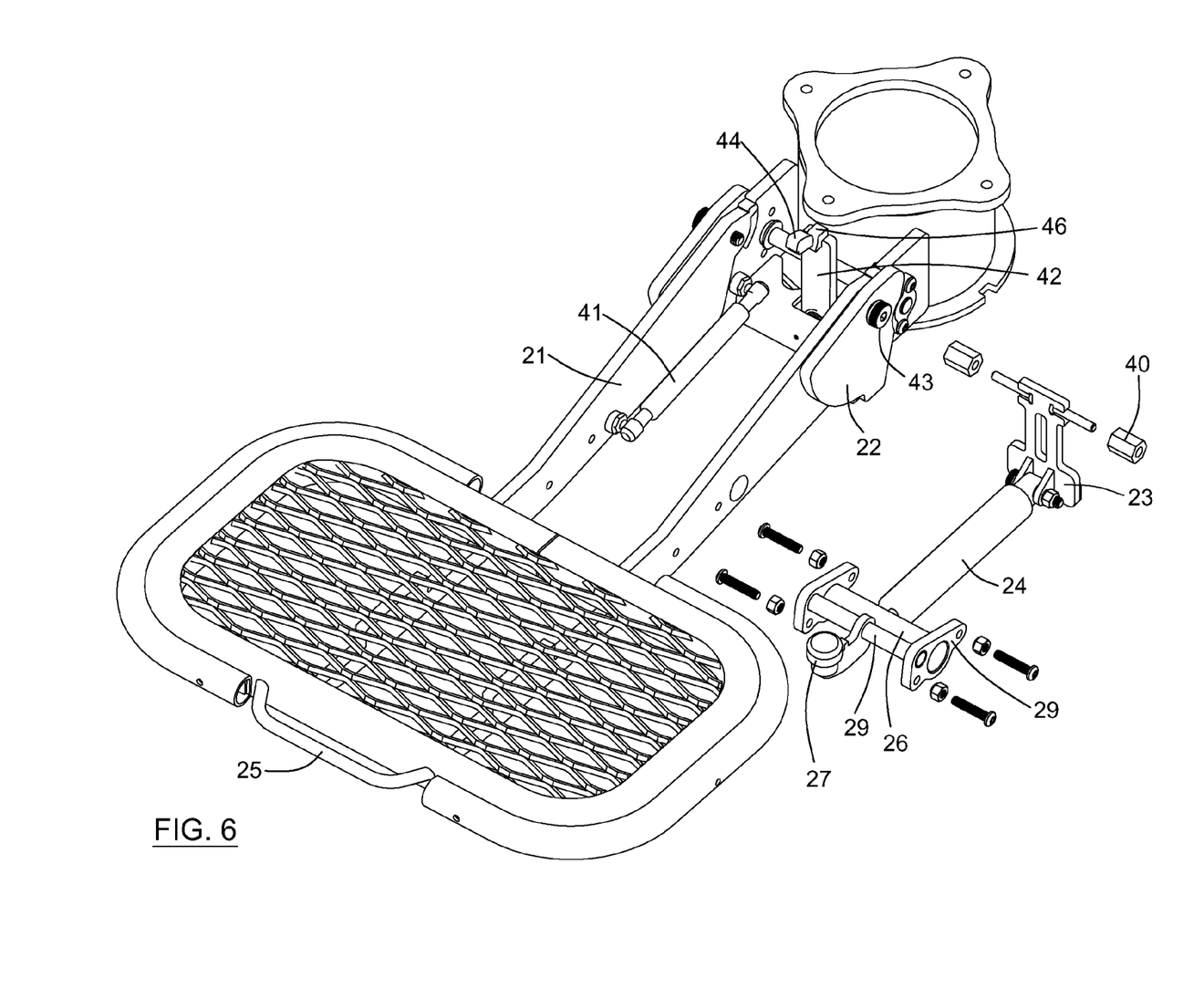
FIG. 6 is a partially exploded perspective view of a footrest assembly according to another preferred embodiment of the present invention.

The swivel element 20 is rotationally repositionable by previously positioning the arm assembly 45 in an upper swivel reconfiguration position, such as the one shown in FIG. 5. In the upper swivel reconfiguration position, the arm assembly 45 contacts the arm interface assembly including the first and second cam elements 44,46 on the latch element 42 and pivots the plunger 47 away from engagement with one of the rotation notches. This allows free rotation between the cylindrical case element 10 or 14 and the swivel element 20, for swivel adjustment of the seat. Such a configuration limits the swivel positioning of the foot support element between a lower operational position and the upper swivel reconfiguration position.

Preferably, the second cam element 44 is located on the arm assembly 45. The arm assembly 45 may include at least one lateral arm 21 as shown in FIG. 5.

Preferably, as better shown in FIG. 5, the footrest assembly further includes a pivot plate 22 on the fixed pivot structure 70 and a pivot element 43 about which the arm assembly 45 pivots. As better shown in FIG. 7, a bottom pivot limit surface 51 on the fixed pivot structure 70 is shaped to interface with a bottom portion 50 of the first end of the arm assembly 45. A top pivot limit surface 53 on the fixed pivot structure 70 is shaped to interface with a top portion 52 of the first end of the arm assembly 45.

Preferably, the pivot plate 22 conceals the bottom and top limit surfaces 51, 53.

Preferably, the footrest assembly is further provided with a damper 41 for dampening movement between the arm assembly 45 and the swivel element 20.

Figure 8:
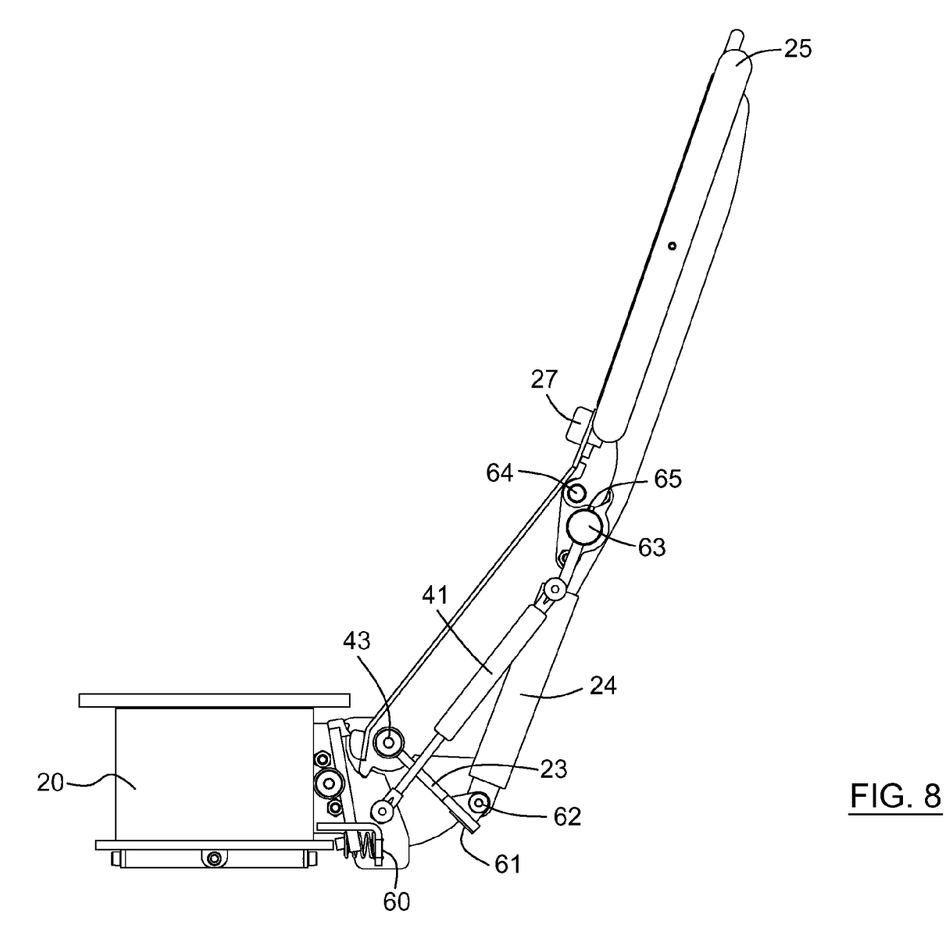
FIG. 8 is a side partially cut view of the footrest assembly shown in FIG. 6, with the arm assembly in an upper swivel reconfiguration position.

Preferably, the footrest assembly further includes an optional and modular height adjustment mechanism. As better shown in FIG. 8, the height adjustment mechanism includes a bottom height limit structure 23 having a first end pivotably mounted on the pivot element 43. A bottom height limit surface 60 mounted on the swivel element 20 is shaped to interface with a second end 61 of the bottom height limit structure 23. A lockable piston element, for example a spring cylinder 24, is pivotably mounted between the second end 62 of the bottom height limit structure 23 and a second pivot 63 mounted on the arm assembly 45. The piston element 24 has a release pin 65. A trigger element, for example a foot button 27, pivotally mounted on the arm assembly (see element 64) proximate the foot support element 25 is provided for actuating the release pin 65 and controlling a length of the piston element 24. With such an arrangement of components, the foot support element 25 is positionable between an adjusted height operational position and the upper swivel reconfiguration position, wherein a lowest adjusted height operational position corresponds to the lower operational position. Hence, the footrest height adjustment operation and swivel reconfiguration operation are independent from each other.

Figure 9:
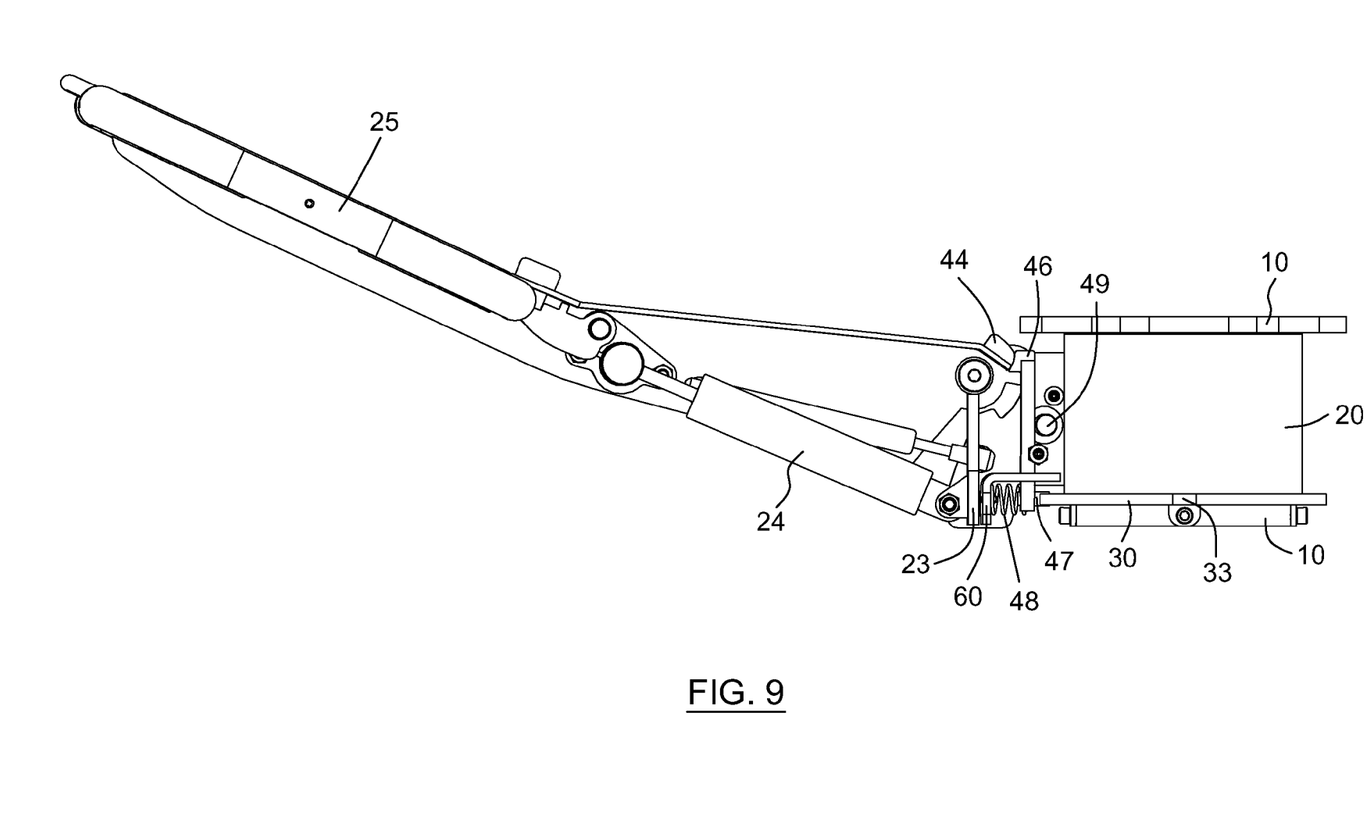
FIG. 9 is another a side partially cut view of the footrest assembly shown in FIG. 6, with the arm assembly in a height adjustment configuration.

FIG. 9 shows a preferred embodiment of the invention with the footrest assembly in the highest height adjustment position when the first and second cam elements 46, 44 are almost in contact. Before this contact occurs, the plunger 47 is deeply engaged into the rotation notches 33 by the action of the resilient element 48. After the contact has occurred, the plunger 47 is quickly disengaged out of the rotation notches 33 to allow free rotation between the fixed cylindrical base element 10 and the external swivel element 20. In this height adjustment configuration, the lockable spring cylinder 24 displaces the height limit structure 23 which interacts with the bottom height limit surface 60 thus defining the footrest assembly height position.

Of course, the scope of the invention should not be limited by the preferred embodiments set forth in the examples, but should be given the broadest interpretation consistent with the description as a whole. Numerous modifications could be made to the above-described embodiments without departing from the scope of the invention, as apparent to a person skilled in the art.

The invention claimed is:

1. A modular footrest assembly for mounting onto a seat base, the footrest assembly comprising:
    a foot support element;
    a cylindrical base element mountable onto the seat base;
    a swivel element comprising an external cylinder rotatable about the cylindrical base element and a fixed pivot structure extending towards the foot support element;
    a retaining ring mounted on the cylindrical base element to rotationally guide the swivel element and comprising a plurality of rotation notches;
    an arm assembly having a first end pivotably attached to the fixed pivot structure and a second end attached to the foot support element;
    a swivel latch mechanism for locking a position of the swivel element, the swivel latch mechanism comprising:
    a latch element pivotably mounted on the fixed pivot structure and comprising an arm interface assembly and a plunger shaped to engage each of the plurality of rotation notches on the retaining ring; and
    a resilient element for urging the plunger towards engagement with one of the plurality of rotation notches,
    wherein the swivel element is rotationally repositionable by lifting the arm assembly in a swivel reconfiguration position whereby, in the swivel reconfiguration position, the arm assembly contacts an arm assembly contact surface on the latch element and pivots the plunger away from engagement with said one of the plurality of rotation notches.

2. The footrest assembly according to claim 1, further comprising:
    a pivot plate on the fixed pivot structure;
    a pivot element about which the arm assembly pivots;
    a bottom pivot limit surface on the fixed pivot structure shaped to interface with a bottom portion of the first end of the arm assembly; and
    a top pivot limit surface on the fixed pivot structure shaped to interface with a top portion of the first end of the arm assembly;
    wherein the foot support element is positionable between a lower operational position and an upper swivel reconfiguration position.

3. The footrest assembly according to claim 2, wherein the pivot plate conceals the bottom and top limit surfaces.

4. The footrest assembly according to claim 3, further comprising a damper for dampening movement between the arm assembly and the swivel element.

5. The footrest assembly according to claim 4, wherein the arm interface assembly comprises first and second cam elements.

6. The footrest assembly according to claim 3, wherein the arm interface assembly comprises first and second cam elements.

7. The footrest assembly according to claim 3, further comprising a footrest height adjustment mechanism comprising:
    a bottom height limit structure having a first end pivotably mounted on the pivot element;
    a bottom height limit surface mounted on the swivel element and shaped to interface with a second end of the bottom height limit structure;
    a lockable piston element pivotably mounted between the second end of the bottom height limit structure and a second pivot mounted on the arm assembly, the piston element comprising a release pin; and
    a trigger element pivotably mounted on the arm assembly proximate the foot support element for actuating the release pin and controlling a length of the piston element;
    wherein the foot support element is positionable between an adjusted height operational position and the upper swivel reconfiguration position, wherein a lowest adjusted height operational position corresponds to the lower operational position, and
    wherein a footrest height adjustment operation and a swivel reconfiguration operation are independent from each other.

8. The footrest assembly according to claim 7, wherein the arm interface assembly comprises first and second cam elements.

9. The footrest assembly according to claim 2, further comprising a footrest height adjustment mechanism comprising:
    a bottom height limit structure having a first end pivotably mounted on the pivot element;
    a bottom height limit surface mounted on the swivel element and shaped to interface with a second end of the bottom height limit structure;
    a lockable piston element pivotably mounted between the second end of the bottom height limit structure and a second pivot mounted on the arm assembly, the piston element comprising a release pin; and
    a trigger element pivotably mounted on the arm assembly proximate the foot support element for actuating the release pin and controlling a length of the piston element;
    wherein the foot support element is positionable between an adjusted height operational position and the upper swivel reconfiguration position, wherein a lowest adjusted height operational position corresponds to the lower operational position, and
    wherein a footrest height adjustment operation and a swivel reconfiguration operation are independent from each other.

10. The footrest assembly according to claim 9, wherein the arm interface assembly comprises first and second cam elements.

11. The footrest assembly according to claim 2, further comprising a damper for dampening movement between the arm assembly and the swivel element.

12. The footrest assembly according to claim 11, wherein the arm interface assembly comprises first and second cam elements.

13. The footrest assembly according to claim 2, wherein the arm interface assembly comprises first and second cam elements.

14. The footrest assembly according to claim 1, further comprising a damper for dampening movement between the arm assembly and the swivel element.

15. The footrest assembly according to claim 14, wherein the arm interface assembly comprises first and second cam elements.

16. The footrest assembly according to claim 1, wherein the arm interface assembly comprises first and second cam elements.

17. The footrest assembly according to claim 16, wherein the arm interface assembly comprises first and second cam elements.

\* \* \* \* \*